United States Patent
Mitsui et al.

[11] 3,896,793
[45] July 29, 1975

[54] ENDOSCOPE WITH VIEW FIELD ALTERING MEANS

[75] Inventors: Kazuhiko Mitsui; Katsuyuki Kanehira, both of Tokyo, Japan

[73] Assignee: Olympus Optical Co., Ltd., Tokyo, Japan

[22] Filed: June 17, 1974

[21] Appl. No.: 479,992

[30] Foreign Application Priority Data
June 19, 1973 Japan.................................. 48-69007
June 19, 1973 Japan.................................. 48-69008

[52] U.S. Cl. .................................................. 128/6
[51] Int. Cl.²........................................... A61B 1/06
[58] Field of Search ........................ 128/4–9, 303.1, 128/303.15

[56] References Cited
UNITED STATES PATENTS
3,561,432  2/1971  Yamaki et al. .......................... 128/6
3,818,902  6/1974  Kinoshita et al......................... 128/6

FOREIGN PATENTS OR APPLICATIONS
711,949     7/1931  France................................... 128/7
1,053,722   3/1959  Germany ............................... 128/7

*Primary Examiner*—Richard A. Gaudet
*Assistant Examiner*—Henry S. Layton

[57] ABSTRACT

The forward end portion of a fiber bundle provided within the endoscope is extended to the distal end section of the endoscope. Fixed to said portion is a member, to which is fixed one end of an actuating wire. When the other end of the actuating wire is operated at a control unit, said member is moved. As the result, the axial line of the forward end portion of the fiber bundle is moved to permit the end plane of said forward end portion to be directed from one view field to another. Said member is formed with a recess for receiving a forceps therein, and the forceps received in said recess are moved together with said forward end portion moved in accordance with the movement of the member.

7 Claims, 11 Drawing Figures

ENDOSCOPE WITH VIEW FIELD ALTERING MEANS

BACKGROUND OF THE INVENTION

This invention relates to an endoscope, and more particularly to a so-called view field altering type endoscope capable of variously altering with the distal end section of said endoscope resting at a predetermined position a view field of the body cavity of a human being which is to be observed and illuminated for observation through said distal end section being inserted into said body cavity.

Generally, in the endoscope of today, there is used as the light conducting means a fiber bundle for drawing out up to the control unit the image of a view field from the distal end section inserted into the body cavity and introducing an illumination light for illuminating the view field up to the distal end section from the control unit.

In the endoscope using the foregoing fiber bundle, it is impossible to sufficiently enlarge the diameter of the fiber bundle, so that where said bundle is used, for example, as an image guide, a small view field can be only observed or camera-photographed. Further, where said bundle is used as an illumination guide, a view field capable of being illuminated by said guide is disadvantageously small.

For eliminating the above-mentioned drawbacks a so-called view field altering type endoscope has recently been proposed which enables various alterations of view field even in the case where the distal end section is in a state unmoved within the body cavity.

Conventionally, in this type of endoscope, where the fiber bundle is used as an image guide, a prism is disposed in front of the forward end of the image guide and is rocked through various angles by the operations in the control unit, whereby the image introduction end plane of said forward end is directed to various view fields of the body cavity. In the endoscope having such construction, however, when the prism is rocked, the optical aberration is varied with the rocked position of the prism, so that the image of a view field becomes liable to be disabled from being observed or camera-photographed with precision.

Further, in an endoscope of the type wherein the fiber bundle is used as an illumination light guide, the forward end portion of the illumination light guide is sectorially enlarged to the maximum size of the window opening formed in the distal end section to enable the illumination of view field over a wide angular range. In the endoscope having such construction, however, a wide range of view field including not only a view field at one observing time but also a different view field at another is always uniformly illuminated, so that a light volume is disadvantageously reduced per unit field area. When it is desired to obtain a required volume of light using such construction, a larger amount of fiber is required with the resultant enlargement of the bundle diameter and the resultant increase in manufacturing cost.

Further, the aforesaid endoscope of the type wherein the fiber bundle is used as an illumination light guide also includes the one having a construction wherein a prism is disposed in front of the forward end of the illumination guide to enable a wide range of view field to be illuminated by rocking said prism. But, the endoscope constructed as such also has the drawback that it is impossible to enlarge a light distribution angle to a sufficient extent. When the light distribution angle is desired to be enlarged, a larger prism should be used. However, since the inner space of the distal end section is small, it becomes extremely troublesome to dispose a large-sized prism within said section. In addition, this type of endoscope has the draw-back that the use of a prism increases the loss of light volume which results from the reflection or absorption of light.

In addition to the above-mentioned various problems, the following problems arise from the prior art view field altering type endoscope. Namely, where the endoscope is constructed such that a forceps is inserted into the body cavity thereby sampling the tissue of a living body falling within a view field, the tip portion of the forceps has to be so moved in accordance with the view field altering operation as to directed direction to the altered view field. The directional alteration of the tip portion of the forceps is performed by a forceps raising member which generally is provided within the distal end section and operated in accordance with the operation in the control unit. The prior art view field altering type endoscope, however, has no such construction as operates the forceps raising member in such a manner as to follow the altering operation of a view field, but requires the respective independent operations, so that it is difficult to direct the tip portion of the forceps quickly and exactly to a predetermined position. As the result, the forceps raising member is often subjected to the erroneous operation to cause the tip portion of the forceps to be guided outside the range of the altered view field, failing to sample the object portion of a living body tissue or damaging the inner wall of the body cavity.

SUMMARY OF THE INVENTION

An endoscope according to the invention is characterized in that the forward end portion of a flexible fiber bundle used as a light conducting means is moved by actuating means fixed at one end to a movable member attached to said forward end portion, thereby directing the light passing plane of said forward end portion quickly and exactly to various view fields of the body cavity through a window opening formed in the distal end section.

In the endoscope of the invention, the forward end portion of the fiber bundle is directly moved to various positions, so that where said bundle is used as an image guide, a wide range of view field of the body cavity can clearly be observed or camera-photographed. Further, where said bundle is used as an illumination light guide, this guide enables various view fields to be illuminated always with a desired brightness. These constitute the advantages of the endoscope in accordance with the invention.

Furthermore, the endoscope of the invention requires no optical means, such as a prism, for effecting alteration of view field, so that the inner space of the distal end section is made larger to facilitate the designing of the endoscope.

According to an embodiment of the invention, a fiber bundle is used as an image guide. An objective lens is disposed in front of the forward end portion of said image guide and is supported by a movable member mounted onto said forward end portion. This offers the advantage that the position of the objective lens relative to the forward end portion of the image guide is maintained always constant by said movable member.

According to another embodiment of the invention, a movable member mounted onto the forward end portion of a fiber bundle is formed with a recess for receiving a forceps therein. With the forceps in engagement with the recess, it is moved together with the movable member by an actuating wire. For this reason, the tip portion of the forceps is moved always in interlocking relationship with the forward end portion of the fiber bundle in the same direction as that in which the light passing plane of said forward end portion is directed to a view field, so that the tip portion of the forceps is automatically positioned with precision toward the altered view field, eliminating the necessity of performing the particular alteration of the forceps by an operator each time the operator carries out the alteration of view field.

According to another embodiment of the invention, said movable member supports the respective forward end portion of two fiber bundles, one being used as an image guide and the other as an illumination light guide. The movement of the movable member in accordance with the actuating wire enables the image and illumination light guide to be simultaneously directed to a different view field.

Accordingly, an object of the invention is to provide a view field altering type endoscope simple in construction and readily operable.

Another object of the invention is to provide a view field altering type endoscope which, where the fiber bundle used as light conducting means is an image guide, enables images of various view fields of the body cavity to be clearly and precisely observed or camera-photographed through said image guide.

Still another object of the invention is to provide a view field altering type endoscope which, where the fiber bundle used as light conducting means is an illumination light guide, enables an illumination light introduced into the body cavity through said illumination light guide to maintain always its predetermined brightness over a wide variety of view fields.

Further object of the invention is to provide a view field altering type endoscope wherein the tip portion of a forceps is moved in interlocking relationship with the movement of the forward end portion of the fiber bundle used as light conducting means and thereby always automatically directed to any position within a view field to which the forward end portion of the fiber bundle is directed.

DESCRIPTION OF THE PREFERRED EMBODIMENTS

Figure 1:
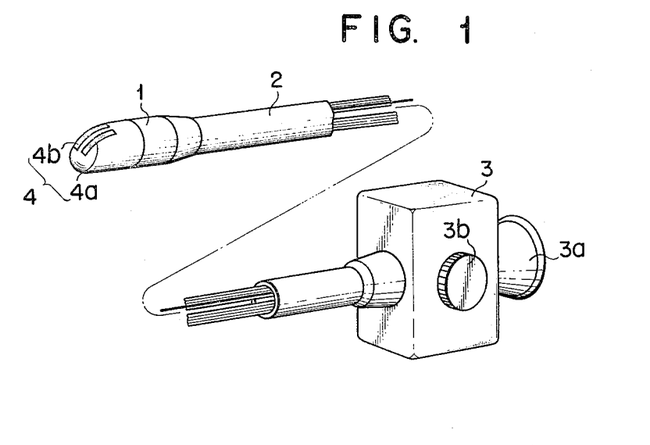
FIG. 1 is a general perspective view, partly broken, of an endoscope according to a first embodiment of the invention.

An endoscope embodying the invention shown in FIG. 1 includes a distal end section 1, a flexible tube section 2 connected at one end to said distal end section 1, and a control unit 3 connected to the other end of said flexible tube section 2. The distal end section 1 is inserted into the body cavity of a human being up to a predetermined position thereof while guided by the flexible tube section 2 through the operation of the control unit 3 by an operator or viewer. The outer surface of the distal end section 1 is formed with a window opening 4. In FIG. 1, the window opening 4 is divided into two windows, one being a view window 4a and the other an illumination window 4b. The control unit 3 is provided with an eye-conducting section 3a having an eyepiece (not shown) disposed therein and with a turnable control knob 3b at one side.

The construction of the above-described endoscope is substantially the same in appearance as that of the conventional endoscope.

Figure 2:
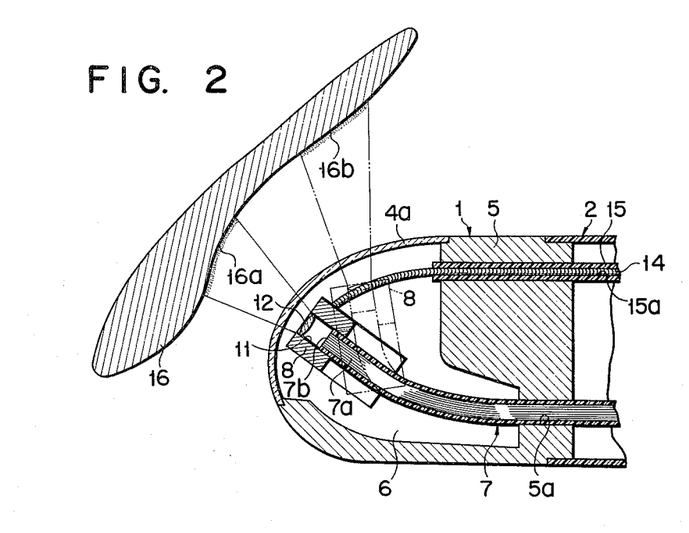
FIG. 2 is an enlarged longitudinal sectional view of the distal end section of said endoscope, showing particularly the inner structure of said section.

Referring to FIG. 2 and the succeeding figures, the distal end section 1 having a construction with characterizes the invention will be explained.

Figure 3:
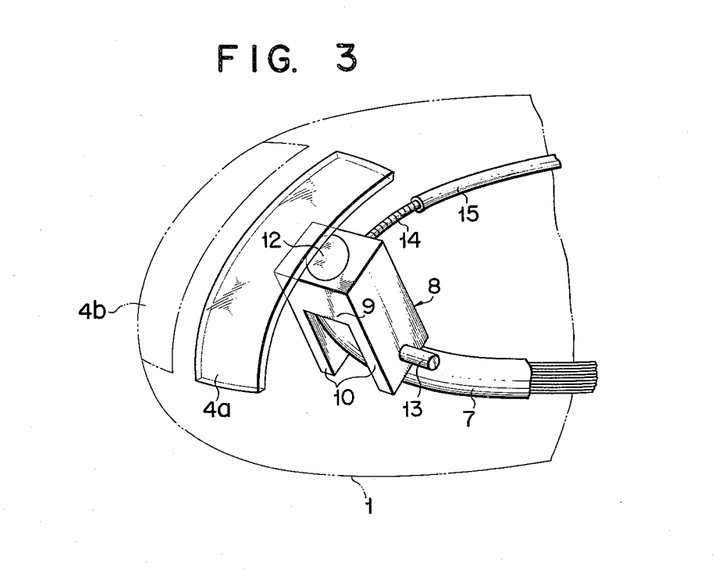
FIG. 3 is a more enlarged perspective view of the distal end section, wherein the outline of the distal end section shown in FIG. 2 is indicated by two dots-and-dash lines and wherein the main part of the distal end section is denoted by solid lines.

Referring to FIGS. 2 and 3, within the distal end section 1 a void space 6 is formed which is defined by the view window 4a constituting the window opening 4 and a base frame 5. Into said space 6 is extended the forward end portion 7a of a flexible fiber bundle 7. Said fiber bundle 7 functions as a light conducting means, and is constituted by a large number of fibers and a tube wrapping them. The light conducting means 7 shown in FIG. 2 is a fiber bundle used as an image guide. The fiber bundle 7 is inserted through a through hole 5a provided in the base frame 5 at the proximity of the forward end 7a of the fiber bundle 7. The base end of the fiber bundle 7, though not shown in FIG. 2, is extended up to the eye-contacting section 3a of the control unit 3 by passing through the interior of the flexible tube section 2.

A movable member 8 is mounted onto the forward end portion 7a of the fiber bundle 7 as an image guide. Namely, as shown in FIG. 3, the movable member 8 has a base portion and a pair of ear portions 10 rearwardly integrally extended from both ends thereof, and the base portion 9 is formed lengthwise at its center with a through hole 11 having a circular inner wall. The foward end portion 7a of the fiber bundle 7 is inserted into the rear end of the through hole 11 and firmly fixed. An objective lens 12 is fixed within the through hole 11 ahead of the end plane 7b of the forward end portion 7a. A pivot pin 13 is secured to each of said paired ear portions 10 of the movable member 8. These pivot pins 13 act as support means for rockably supporting the movable member 8 to the base frame 5 within the space 6. Though not shown, the pivot pins 13 are rotatably attached to the base frame 5. To the upper surface of said member 8 is firmly secured one end of an actuating wire 14 functioning as movable member actuating means. The other end of the actuating wire 14 is slidably inserted into a wire insertion channel 15a inside of a tube 15 extending into the base frame 5 and the flexible tube section 2.

The end plane 7b of said fiber bundle 7 is directed to one view field 16a of the inner wall 16 of body cavity of a human being. The image of the view field 16a is introduced from the end plane 7b into the image fiber bundle 7 and brought up to the control unit 3. The image having appeared at the base end plane not shown of the fiber bundle is observed via the eyepiece by a viewer or camera-photographed. It is to be noted that a cover glass is fitted to the view window 4a.

When, in the endoscope having the aforesaid construction, the knob 3b provided for the control unit 3 is turned by a viewer or operator, the actuating wire 14 is pulled to slide toward the right side of FIG. 2 by passing through a channel 15a. As the result, the movable member 8 is rocked clockwise about the pivot pin 13 by the actuating wire 14 to raise the forward end portion 7a of the fiber bundle 7, so that the axial line of said forward end portion is varied in direction to permit the end plane 7b to be turned upwardly. In FIG. 2, the condition in which the movable member 8 is rocked is shown by two dots-and-dash lines. The view field 16a heretofore given to the image guide bundle 7 is altered to a different view field 16b by said rocking of the movable member 8. The image of the view field 16b is observed via a fiber bundle 7 by a viewer or camera-photographed.

Various adjustments in turning amount of said control knob 3b permit the movable member 8 to be rocked up to any desired position, so that even when the distal end section 1 rests at a position within the body cavity, the end plane 7b of the fiber bundle 7 can be so turned as to enable a wide variety of view fields to be observed.

It is to be noted that the movable member 8 can be rocked a little further in a counter-clockwise direction from the position of the movable member 8 shown by solid lines in FIG. 2. Further, where the movable member 8 is rocked as indicated by two dots-and-dash lines in FIG. 2, there is no fear that the forward end portion 7a of the fiber bundle conflicts with the member 8 to be damaged because a large space is previously formed between the paired ear portions 10.

Figure 4:
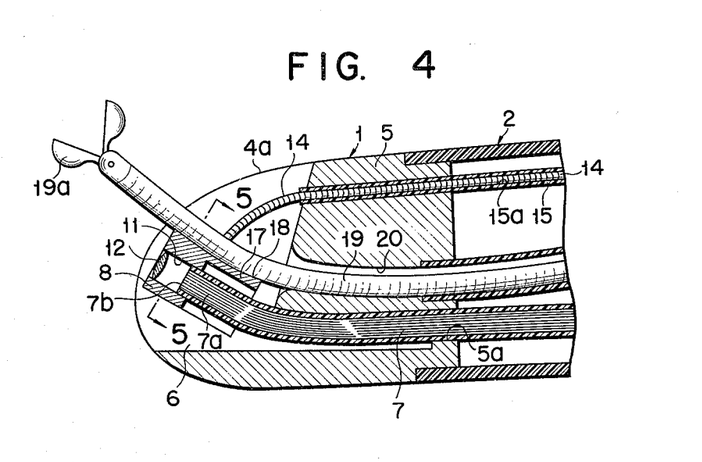
FIG. 4 is a longitudinal sectional view of the distal end section of an endoscope according to a second embodiment of the invention, showing particularly the inner structure of said section.
Figures 5, 6:
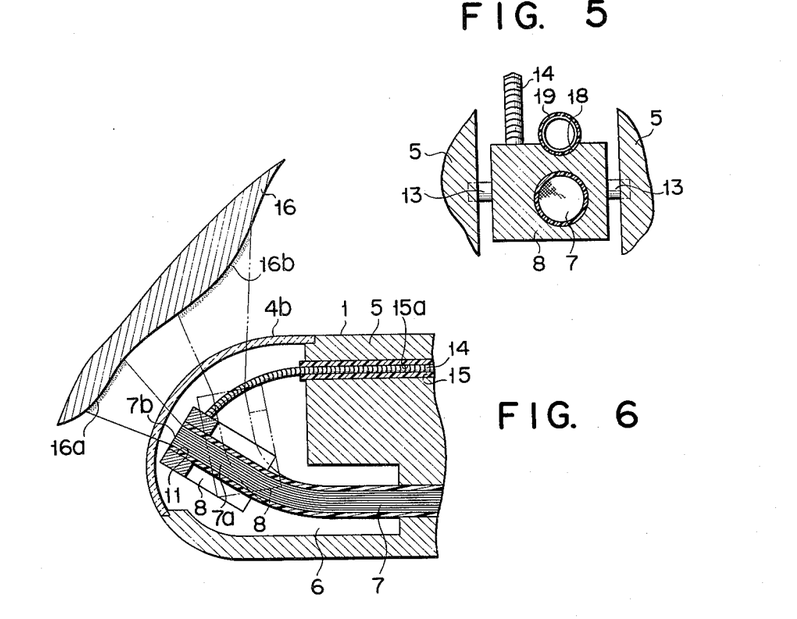
FIG. 5 is a cross sectional view on line 5—5 of FIG. 4.
FIG. 6 is a longitudinal sectional view of the distal end section of an endoscope according to a third embodiment of the invention, showing particularly the inner structure of said section.

An endoscope according to a second embodiment shown in FIGS. 4 and 5 has a similar construction to that of the endoscope according to the preceding first embodiment, and therefore description is made with the same parts and sections denoted by the same reference numerals.

The forward end portion 7a of a light conducting fiber bundle 7 is extended into the space 6 defined by the base frame 5 and the view window 4a constituting the window opening. Said bundle 7 is used as an image guide as in the preceding embodiment. The movable member 8 is mounted onto the forward end portion 7a as in the preceding embodiment. The movable member 8 has the base portion 9, a pair of ear portions 10 extended rearwardly from both ends of said base portion 9 and a third ear portion 17 integrally extended rearwardly from the upper end of the base portion 9 so as to be stretched between the upper ends of said paired ear portions 10. Said base portion 9 is formed with the through hole 11 having a circular inner wall as in the first embodiment. Fitted into the through hole 11 is the forward end portion 7a of the bundle. Simultaneously mounted within said through hole 11 is an objective lens 12. The movable member 8 is rockably supported by the paired pivot pins 13 which are supported by the base frame 5 as shown in FIG. 5.

The movable member 8 is formed at its entire upper surface with a recess 18 having a semicircular arcuate cross section. The recess 18 is positioned right above the through hole 11 in parallel with the axial line thereof.

A forceps 19 is received on said recess 18. Said forceps 19 is inserted into a forceps insertion channel 20 formed in the base frame 5, and the tip portion 19a thereof is extended to the exterior from the view window 4a. The forceps insertion channel 20 is extended also into the interior of the flexible tube section 2, and is extended up to the control unit 3 though not shown. The forceps is inserted into the insertion channel 20 from said control unit 3.

The movable member actuating wire 14 is inserted into the channel 15a of the tube 15 extending over the base frame 5 and flexible tube section 2, and is fixed at one end to the upper surface of the movable member 8. The base end of the wire 14 is connected to the control knob 3b shown in FIG. 1, but the illustration thereof is omitted.

When the actuating wire 14 is pulled in accordance with the operation of the control knob 3b, the member 8 is rocked to permit the axial line of the forward end portion 7a to be so varied in direction as to raise the forward end portion 7a of the fiber bundle 7, so that the end plane 7b is turned up. A view field of the body cavity to which the end plane 7b faces via the objective lens 12 is altered from one field to another. During the alteration of view field, the forceps 19 is kept engaged with the recess 18 and moved together with the member 8, so that the tip portion 19a is so turned as to permit the end plane 7b exactly to face a new view field. Accordingly, in the endoscope having this construction, it is not necessary that a viewer operates the forceps 19 independently at the control unit 3 for altering the direction of the tip portion 19a.

As above described, the movable member 8 having the recess 18 plays the role of altering in direction both the forward end portion 7a of the fiber bundle 7 and the tip portion 19a of the forceps 19. The latter role is conventionally performed by a forceps raising member. But the construction of the invention renders it unnecessary to use such a particular forceps raising member.

Figure 7:
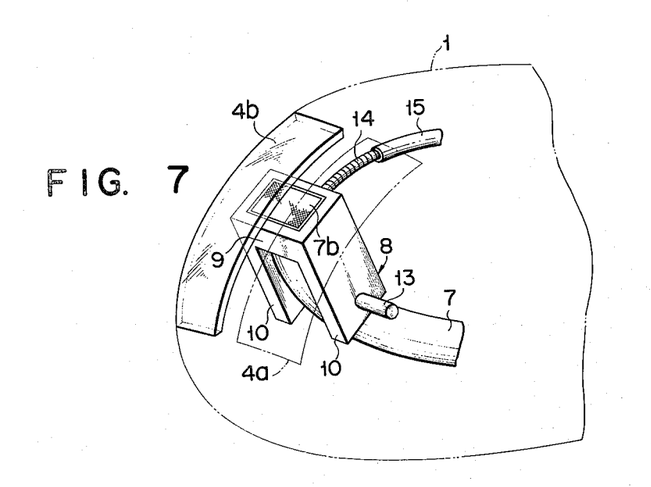
FIG. 7 is a more enlarged perspective view of the distal end section, wherein the outline of the distal end section shown in FIG. 6 is indicated by two dots-and-dash lines and wherein the main part of the distal end section is denoted by solid lines.

In an endoscope according to a third embodiment shown in FIGS. 6 and 7, the fiber bundle as the light conducting means constitutes an illumination light guide. The endoscope has a substantially similar construction to that of the first embodiment excepting that it has no objective lens. Accordingly, the same parts and sections as those of the first embodiment are denoted by the same reference numerals, and description thereof is omitted.

According to the third embodiment, the forward end portion 7a of the fiber bundle 7 used as the illumination light guide is extended into the space 6 defined by the base frame 5 and an illumination window 4b constituting the window opening 4 formed in the distal end section 1. Mounted onto said portion 7a is a movable member 8. The portion 7a is fully inserted into the through hole 11 formed in the movable member 8, and is fixed. As the result, the end plane 7b of the portion 7a is made flush with the front surface of the member 8.

The base end of the illumination light guide bundle 7 is passed through the flexible tube section 2 and extended into the interior of the control unit 3 and connected there to a proper light source, though not shown. A light from the light source is guided forwardly through the bundle 7 and illuminates a view field 16a of the inner wall of the body cavity via the illumination window 4b from the end plane 7b.

When the actuating wire 14 is pulled, the movable member 8 is rocked about the pivot pin 13, for example, up to a position indicated by two dots-and-dash lines. The forward end portion 7a of the fiber bundle 7 is raised by said rocking to permit the axial line thereof to be varied in direction thus causing the end plane 7b to be turned up. As the result, the illumination light from the end plane 7b is allowed to illuminate a different view field 16b.

Since, as above described, the forward end portion 7a of the illumination light guide bundle 7 is directly moved by the actuating wire 14, illumination is made always with a proper light volume on a wide variety of view fields.

Figure 8:
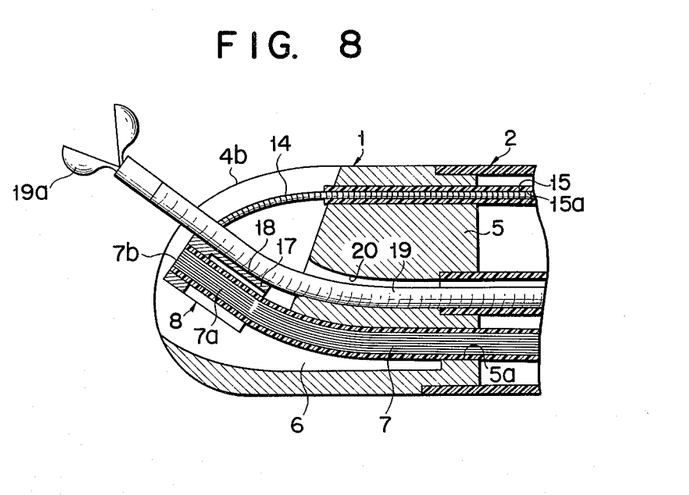
FIG. 8 is a longitudinal sectional view of the distal end section of an endoscope according to a fourth embodiment of the invention, showing particularly the inner structure of said section.
Figure 9:
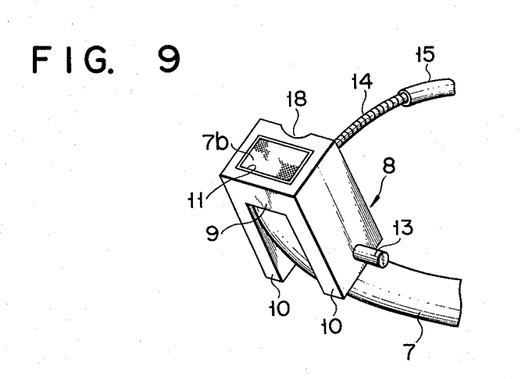
FIG. 9 is an enlarged perspective view showing the main part of the distal end section shown in FIG. 8.

An endoscope according to a fourth embodiment shown in FIGS. 8 and 9 has a construction which is considered as a combination of the movable member 8 in the third embodiment with the recess 18 for receiving the forceps therein described in the second embodiment. For this reason, in the fourth embodiment, the movable member 8 is further provided with a third ear portion 17 integrally from the base portion 9, and is formed at its entire upper surface with said recess 18 having a semicircular, arcuate cross section.

As shown in FIG. 8, a forceps 19 is received in said recess 18, which moves the forceps 19 in accordance with the rocking movement of the member 8 functioning as a forceps raising member. The tip portion 19a of the forceps 19 is altered in direction in the same manner as explained in the second embodiment.

As the movable member 8 is rocked about the pivot pin 13, the axial line of the forward end portion 7a of the illumination light guide bundle 7 is varied in direction, and the end plane 7b permits an illumination light to be irradiated therethrough onto a different view field in the same manner as described in the third embodiment.

The forward end portion 7a is moved in interlocking relationship with the forceps via the movable member 8. Accordingly, the end plane 7b is moved in a manner following the tip portion 19a of the forceps 19 so that said tip portion 19a may be always automatically directed to a different view field illuminated by the end plane 7b.

The endoscope of the fourth embodiment is also provided with the forceps insertion channel 20 as in the second embodiment.

The through hole 11 formed in the movable member 8 shown in FIGS. 6 through 9 has a rectangular cross section unlike the circular through hole 11 shown in FIGS. 2 through 5. Accordingly, when the fiber bundle is inserted into such rectangular through hole 11 and fixed, the bundle portion to be inserted is also formed into a rectangular shape. For the purpose of enlarging the area of the end plane 7b as much as possible, it was formed into a rectangular shape, but the configuration thereof is not limited thereto.

Figure 10:
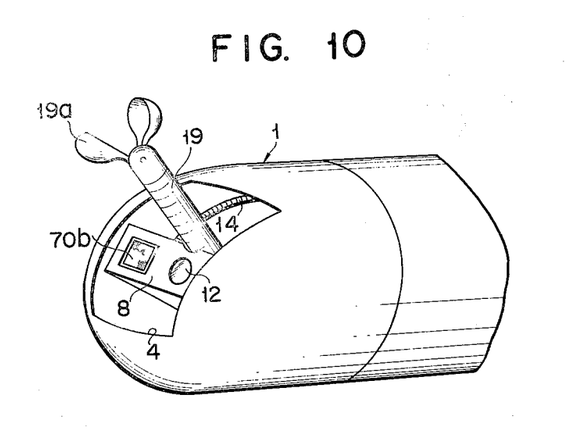
FIG. 10 is a perspective view showing the distal end section in particular of an endoscope according to a fifth embodiment of the invention.
Figure 11:
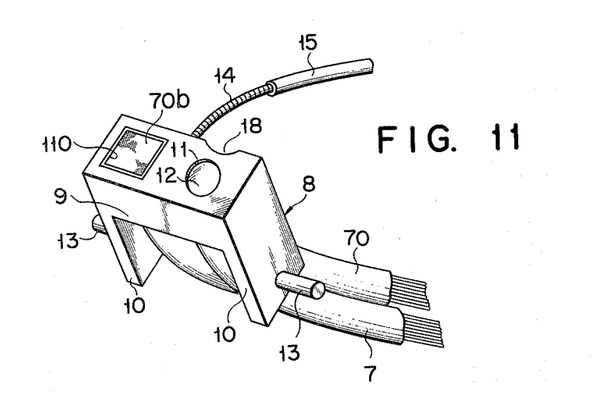
FIG. 11 is an enlarged perspective view of the main part of the distal end section shown in FIG. 10.

In an endoscope according to a fifth embodiment shown in FIGS. 10 and 11, a movable member 8 similar to that described in the preceding embodiments is disposed within the space 6 of the distal end section 1. The respective forward end portions of two fiber bundles 7 and 70 are mounted onto said member 8 in a juxtaposed condition. One fiber bundle 7 is an image guide bundle and the other fiber bundle 70 is an bundle, light guide bundle. Through holes 11 and 110 for allowing the respective forward ends of the bundles 7 and 70 to be inserted therethrough are formed in the movable member 8 in parallel with the axial line thereof. Though not shown particularly in detail, the forward end portion of the bundle 7 is inserted for fixation into one circular through hole 11, and the objective lens 12 is fitted ahead of said forward end portion into said hole 11. On the other hand, the forward end portion of the illumination light guide bundle 70 is fully inserted into the rectangular through hole 110 and fixed. As the result the end plane of this forward end portion is made substantially flush with the front plane of the movable member 8.

The movable member 8 is formed at its entire upper surface with the recess 18 having a semicircular, arcuate cross section. As shown in FIG. 10, the forceps 19 is received in said recess 18. Further, the actuating wire 14 is fixed at one end onto the upper surface of the movable member 8. The member 8 is rocked about the pivot pin 13 by pulling the wire 14 in the same manner as in the preceding embodiments.

In this embodiment, the respective forward ends of the image guide bundle 7 and illumination light guide bundle 70 are fitted into the movable member 8 in a juxtaposed condition, so that the respective axial lines of the forward end portions of both bundles 7, 70 are altered in the same direction by the rocking of the member 8 effected in accordance with the actuation of the wire 14. Accordingly, when the image guide bundle 7 is moved from the position for observing one view field to the position for observing another, the illumination light guide 70 is so moved as to permit an illumination light to be irradiated from said one view field to said another. Since, therefore, it is not necessary to operate independently the image guide 7 and illumination light guide bundle 70, the operation thereof is simplified. The forceps 19 is also moved together with said guides 7 and 70 by means of the recess 18. Namely, since the movable member 8 concurrently functions as a forceps raising member, the operation for altering a view field is more simplified than in the prior art.

It is to be noted that in this embodiment the window opening 4 consists of a single window constituting a large opening.

What we claim is:

1. In an endoscope having a distal end section formed with a window opening, a flexible tube section having one end connected to said distal end section in order to insert and guide the end section into the body cavity of a human being, and a control unit connected to the other end of the flexible tube section, said endoscope comprising a flexible fiber bundle disposed lengthwise within the distal end section and the flexible tube section in a manner extending thereover and having a forward end portion extended up to the window opening of the distal end section and an end plane formed in said forward end portion for allowing light to pass therethrough, said end plane being directed to a view field of the body cavity through the window opening; a movable member mounted onto the forward end portion of said fiber bundle; and movable member actuating means having one end connected to said movable member for moving the movable member within the distal end section upon operation thereof at the control unit thereby to direct the end plane of the forward end portion of the fiber bundle to a different view field of the body cavity.

2. An endoscope according to claim 1, which further comprises support means for rockably supporting said movable member within the distal end section, and wherein said movable member includes a base portion formed with a hole for allowing the forward end portion of the fiber bundle to be inserted thereinto for fixation and a pair of ear portions extended from said base portion, and wherein said support means includes pins respectively secured to said paired ear portions of said movable member.

3. An endoscope according to claim 1, wherein said fiber bundle is used as an image guide for introducing the image of a view field of the body cavity up to the control unit through the end plane of the forward end portion.

4. An endoscope according to claim 3, wherein said movable member further includes an objective lens disposed ahead of the end plane of the forward end portion of the fiber bundle.

5. An endoscope according to claim 4, which further comprises second flexible fiber bundle as an illumination guide having a forward end portion for irradiating an illumination light onto a view field of the body cavity, said forward end portion of said second fiber bundle being fitted to the movable member in a state juxtaposed with the forward end portion of the first aforesaid fiber bundle as the image guide.

6. An endoscope according to claim 1, wherein said fiber bundle is used as an illumination guide for irradiating an illumination light onto a view field of the body cavity through the end plane of said forward end portion.

7. An endoscope according to claim 1, which further comprises forceps insertion means for allowing a forceps to be inserted therethrough, thereby causing the tip end portion of the forceps projectively to extend toward the body cavity through the window opening of the distal end section, and wherein said movable member has a light conduction hole having inserted for fixation thereinto the forward end portion of the fiber bundle and a recess so engaged with the forceps as to retain said forceps substantially in parallel with the axial line of said forward end portion of the fiber bundle.

* * * * *